March 5, 1957   J. R. BROWN   2,783,703
BEVERAGE DISPENSING DEVICES
Filed May 19, 1955
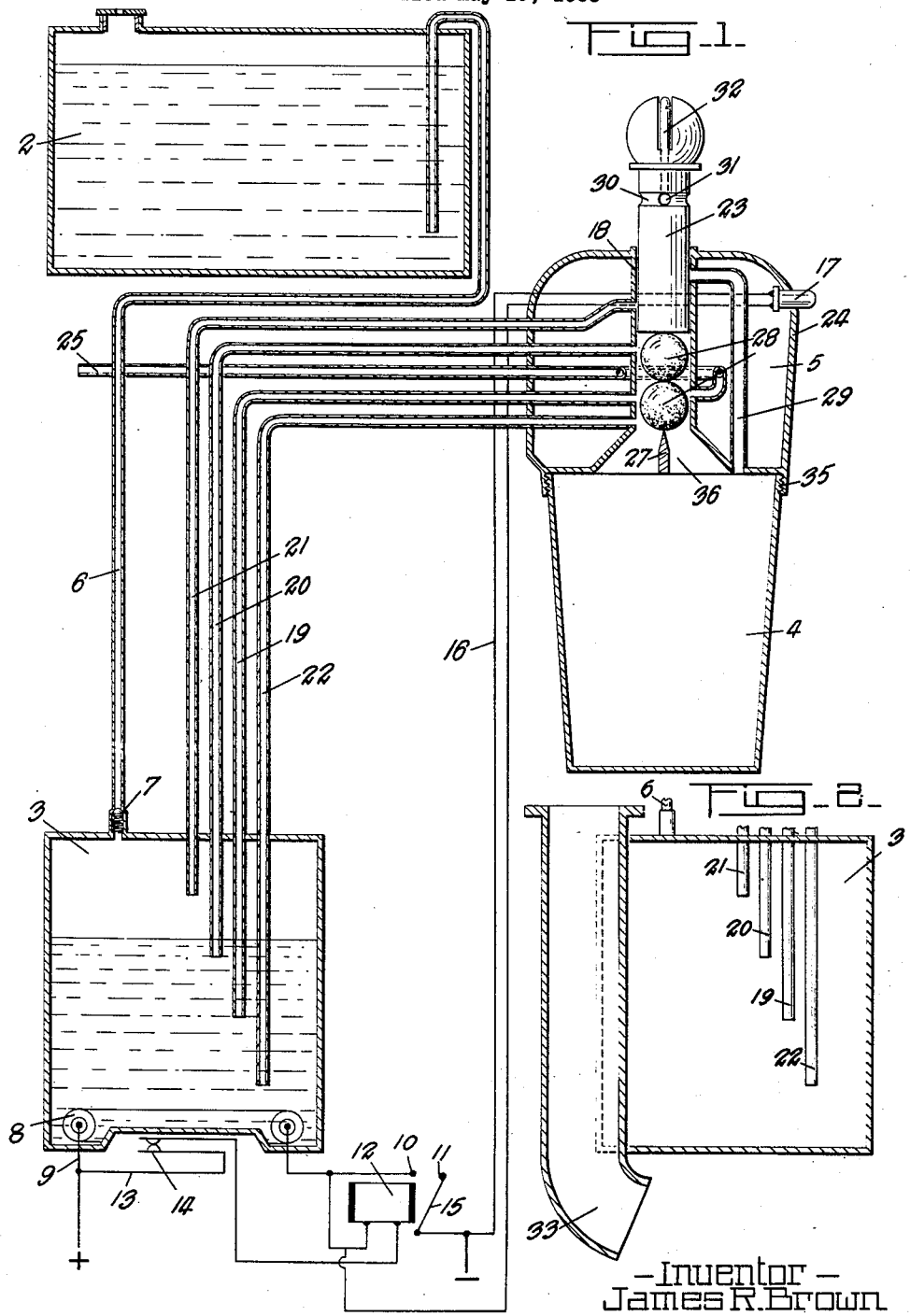
Inventor —
James R. Brown

United States Patent Office 2,783,703
Patented Mar. 5, 1957

2,783,703

BEVERAGE DISPENSING DEVICES

James Rankin Brown, Hamilton, Ontario, Canada

Application May 19, 1955, Serial No. 509,661

10 Claims. (Cl. 99—275)

This invention relates to improvements in devices for dispensing hot beverages automatically in a vehicle powered with an internal combustion engine, and the object of the invention is to utilize the partial vacuum created in the engine intake manifold to withdraw beverage preparing water from a reservoir into a water boiler.

A further and particular object of the invention is to dissolve beverage making pellets, such as instant coffee pellets, in hot water transferred from the water boiler into a suitable dispensing container, the quantity of water fed from the reservoir through the boiler to the dispenser being governed in proportion to the number of beverage pellets placed within the device.

Another and important object of the invention is to provide a tube opening at its lower end into the hot beverage dispensing container and into which the beverage making pellets may be dropped, the upper end of the tube being normally sealed by a manually removable plug which rests upon the pellets and acts as a slide valve in controlling the vacuum suction of water from the reservoir to the boiler and also the passage of heated water from the boiler to the beverage dispensing container; the automatic controlling movement of the plug being governed by the disintegration of the pellets when subjected to the passage of water from the boiler to the dispensing container.

A further object of the invention is to incorporate a steam operated whistle in the plug and which acts as an audible signal to indicate that the dispensing container is charged with the hot beverage.

A very particular objective of the whole invention is to furnish a hot beverage making device which will in a matter of a minute or two prepare any desired quantity of beverage, such as one, two, three, four cups, etc.

With the foregoing and other objects in view as shall appear, my invention consists of a hot beverage making device all as hereinafter more particularly described and illustrated in the accompanying drawing, in which:

Fig. 1 is a schematic view of the arrangement of the invention and showing the boiler heated by an electric heating element.

Fig. 2 is a schematic view of the boiler of the arrangement and showing it heated by the exhaust pipe of a vehicle engine.

The device incorporates a water reservoir 2, a water boiler 3 and a beverage dispensing container 4 secured to a beverage pellet receiving and water flow control arrangement 5.

Water is fed from the reservoir 2 to the boiler 3 through a syphon pipe 6 extending from the lower portion of the reservoir to the top of the boiler and in which communication is controlled by a one way spring held ball check valve 7 which permits water to be sucked from the reservoir but prevents the passage of air or steam from the boiler to the reservoir.

The boiler is heated by an electric element 8 incorporated in its lower portion and energized by the positive side of a circuit 9 extending to ground through the contact points 10 and 11 of an electromagnetic switch having a coil 12. A second circuit 13 is arranged in parallel with the circuit 9 and extends through a thermostat switch 14 actuated by the boiler temperature and from thence through the magnetic coil 12 of the switch; the switch being so arranged that energization of the coil attracts the swingable arm 15 to retain the point 11 carried thereon in contact with the point 10 and thus close the circuit through the heating element 8.

For the initial energization of the coil a circuit 16 controlled by a manual switch 17 is tapped into the coil 12. To energize the heating element 8 the switch 17 is momentarily closed to energize the coil 12 and swing the arm 15 to bring the points 10 and 11 into contact. When this contact is made current flows through the heating element and the coil continues to be energized after the switch 17 opens.

The thermostat switch 14 is set to open when the boiler temperature reaches a predetermined degree and at which time the opening of the switch opens the circuit 13 to the coil 12 whereby the de-energization of the coil permits its switch arm 15 to swing open under the influence of a spring and de-energize the boiler heating element.

The apparatus as illustrated is designed to dispense one to three cups of hot beverage at a time, and to attain this purpose the water flow control arrangement 5 comprises a vertical tube 18 open at its ends and into which the upper ends of three boiler water measuring syphon pipes 19, 20 and 21 open together with the upper end of a hot water transfer pipe 22. The lower ends of the four pipes extend downwardly within the boiler, the lower end of the pipe 22 being in the vicinity of the bottom of the boiler and the lower ends of the pipes 19, 20 and 21 graduated upwardly in successive distances from the bottom of the boiler.

A manually removable slide valve plug 23 normally seals the upper end of the tube 18 which is contained within an air tight shell 24 and to the lower portion of which the hot beverage dispensing container 4 is removably attached, as by the air tight threaded connection 35. To create the necessary reduction in air pressure to withdraw water from the boiler past the check valve 7 into the boiler, a suction pipe 25 extends from an engine intake manifold (not shown) to the tube 18 and opening thereinto in approximately the same position as the opening to the lowermost measuring pipe 19. The lower end of the tube 18 opens into a conical throat 36 across which extends a knife edge bar 27 upon which the beverage making pellets rest upon being dropped into the tube 18 when the plug 23 is removed. The drawing illustrates two coffee pellets 28 supported by the bar and sufficient water in the boiler to make two cups of coffee.

To operate the device for making coffee the plug 23 is removed from the tube 18 and one, two or three compressed coffee pellets dropped thereinto. The pellets are slightly smaller in diameter than the bore of the tube and as the bottom of the plug 23 will rest thereon when reinserted into the tube determine the position of the plug in relation to the number of measuring pipe openings uncovered by the plug. As illustrated, the plug is resting upon two coffee pellets to make two cups of coffee, the openings to the two measuring pipes 19 and 20 being uncovered and the opening to the measuring pipe 21 sealed.

When the device is not in use and prior to the insertion of the pellets the plug 23 drops downwardly a sufficient distance within the tube 18 to cover the opening of the suction pipe 25 but not to cover the opening of the water transfer pipe 22, thus there is no suction or reduction of air pressure within the device until the bottom of the tube 18 is positioned above the opening of the suction pipe 25. It will be thus understood that as soon as the plug rests upon one or more pellets that the device will be subjected to suction with the consequent lowering of air pressure within the boiler 3. As soon as this occurs, as illustrated, water is sucked through the pipe 6 past the check valve 7 into the boiler; the suction being maintained through the hot water transfer pipe 22 and the two exposed water measuring pipes 19 and 20.

When sufficient water has entered the boiler to rise above the bottom of the uppermost pipe, 20 in this instance where two pellets have been inserted into the tube 18, and to cut off the passage of air, water will immediately be drawn through the three pipes 22, 19 and 20 to strike, soak and soften the coffee pellets. Upon this occuring the wet pellets under the weight of the plug pressing them against the edge of the bar 27 instantly disintegrate and permit the plug to drop and seal the openings of the measuring tubes 19 and 20 and the suction tube 25. At this moment the boiler will be filled with water to approximately the level of the bottom of the pipe 20. To energize the boiler water heating element 8, the switch 17 is manually closed for an instant, as previously described, in or around the time the coffee pellets are inserted into the tube 18.

Upon the water reaching boiling point in the boiler, the steam forces the boiling water through the transfer pipe 22 into the dispensing receptacle 4 which contains the disintegrated coffee pellets. The coffee is then ready for use by detaching the dispensing receptacle.

In order to permit the escape of steam and air pressure from the receptacle 4 when the hot water is injected thereinto, a vent tube 29 extends from the bottom of the shell 24 to the upper end of the tube 18, and with the opening of which an annular groove 30 in the plug registers when the plug is in the lowermost position. The groove communicates with a passage 31 within the plug and is connected to a whistle 32 which emits a signal when the boiling water and steam enter the dispensing receptacle 4.

It will be apparent that if a single cup of coffee is required that the use of a single pellet will raise the plug only sufficiently to uncover the opening of the measuring tube 19 with the consequent filling of the boiler to substantially the level of the bottom of such tube which is the measurement of one cup of coffee. Conversely, if three cups of coffee are required three pellets will raise the plunger sufficiently to uncover the opening of the top measuring tube 21 whereby the boiler will fill to approximately the level of the bottom of said tube, being the measurement of three cups of coffee. Should any excess steam pressure develop the plug will move upwardly under pressure and open venting to the suction pipe 25.

In the arrangement shown in Fig. 2, the boiler 3 is positioned alongside the exhaust pipe 33 of an engine and from which heat is transferred to the boiler, the exhaust pipe heat being used in place of the electric element.

Although a particular constructional arrangement of the invention has been shown and described, it will be appreciated that the invention is susceptible to changes and alterations without departing from the spirit thereof as set out in the appended claims.

What I claim as my invention is:

1. In combination with an air suction creating means, an automatic water cycling self priming device for dispensing a predetermined quantity of hot water and comprising a water boiler operatively closed to the atmosphere, means for heating the boiler, a water reservoir from which water is ejected into the boiler under atmospheric pressure, a hot water dispensing container operatively closed to the atmosphere, a water pipe forming a communication between the boiler and the dispensing container, an air suction passage extending from the air suction creating means to the boiler, and a valve element arranged to control the flow of water through the water pipe and the flow of air through the air suction passage.

2. In combination with an air suction creating means, an automatic water cycling self priming device for dispensing a predetermined quantity of hot water and comprising a water boiler operatively closed to the atmosphere, means for heating the boiler, a water reservoir from which water is ejected into the boiler under atmospheric pressure, a plurality of water measuring pipes opening into the boiler in successive graduated distances from the bottom of the boiler and forming communications between the boiler and a dispensing container, an air suction passage extending from the air suction creating means to the boiler, and a valve element simultaneously controlling the flow of air through the suction passage and the flow of water through one or more of the water measuring pipes.

3. In combination with an air suction creating means, an automatic water cycling self priming device for dispensing a predetermined quantity of hot beverage and comprising a water boiler operatively closed to the atmosphere, means for heating the boiler, a water reservoir from which water is ejected into the boiler under atmospheric pressure, a water measuring syphon pipe opening into the boiler, a beverage dispensing container communicating with and operatively closed to the atmosphere and with which the water measuring syphon pipe communicates, an air suction passage extending from the air suction creating means to the boiler, a valve element controlling the flow of water through the water measuring syphon pipe and the flow of air through the air suction passage, water dissolvable beverage making pellets, and a pellet receiving receptacle in which the presence of a pellet opens the valve element to permit air flow through the air suction passage and water flow through the water measuring syphon pipe.

4. In combination with an air suction creating means, an automatic water cycling self priming device for dispensing a predetermined quantity of hot beverage and comprising a water boiler operatively closed to the atmosphere, means for heating the boiler, a water reservoir from which water is ejected into the boiler under atmospheric pressure, a water measuring syphon pipe opening into the boiler, a beverage dispensing container communicating with and operatively closed to the atmosphere and with which the water measuring syphon pipe communicates, an air suction passage extending from the air suction creating means to the boiler, a valve element controlling the flow of water through the water measuring syphon pipe and the flow of air through the air suction passage and also controlling communication of the beverage dispensing container with the atmosphere, water dissolvable beverage making pellets, and a pellet receiving receptacle in which the presence of a pellet actuates the valve element to permit air flow through the air suction passage and water flow through the water measuring suction pipe and to also close communication of the beverage dispensing container with the atmosphere.

5. In combination with an air suction creating means, an automatic water cycling self priming device for dispensing predetermined quantities of hot beverages and comprising a water boiler operatively closed to the atmosphere, means for heating the boiler, a water reservoir from which water is ejected into the boiler under atmospheric pressure, a plurality of water measuring syphon pipes opening into the boiler in successive graduated distances from the bottom of the boiler, a beverage dispensing container operatively closed to the atmosphere and with which the water measuring syphon pipes communicate, a passage extending from the air suction creating means to the boiler, a valve element controlling water flow through the water measuring syphon pipes and air flow through the air suction passage, water dissolvable beverage making pellets, and a pellet receiving receptacle in which the presence of one or more pellets actuates the valve element to permit air flow through the air suction passage and water flow through one or more of the water measuring syphon pipes.

6. A device as defined in claim 5 wherein the valve element comprises a beverage pellet receiving tube communicating with the beverage dispensing container and into the side of which the water measuring syphon pipes open and through which the air suction passage extends, and a slide valve contained within the tube to engage a contained beverage pellet, the slide valve when in engagement with a pellet permitting air flow through the air suction passage and water flow through one or more of the water measuring syphon pipes.

7. A device as defined in claim 5 wherein the valve element comprises an open ended vertical beverage pellet receiving tube opening at its lower end into the beverage dispensing container and into the side of which the water measuring syphon pipes open and through which the air suction passage extends, and a gravity actuated manually insertable slide valve adapted to be inserted within the tube to rest upon a contained beverage pellet, the slide valve when in engagement with a pellet permitting air flow through the air suction passage and water flow through one or more of the water measuring syphon pipes.

8. A device as defined in claim 5 wherein the valve element comprises an open ended vertical beverage pellet receiving tube opening at its lower end into the beverage dispensing container and into the side of which the water measuring syphon pipes open and through which the air suction passage extends, a gravity actuated manually insertable slide valve adapted to be inserted within the tube to rest upon a contained beverage pellet, the slide valve when in engagement with a pellet permitting air flow through the air suction passage and water flow through one or more of the water measuring syphon pipes, and a slide valve controlled vent tube extending from the dispensing container to the side of the pellet receiving tube and closed by the slide valve when it is resting upon a pellet.

9. A device as defined in claim 5 wherein part of the passage extending from the air suction creating means to the boiler is formed by a pipe extending from the boiler to the pellet receiving receptacle to direct a stream of water against a pellet in the receptacle under suction when the valve element is open.

10. A device as defined in claim 5 wherein the valve element comprises an open ended vertical beverage pellet receiving tube opening at its lower end into the beverage dispensing container and into the side of which the water measuring syphon pipes open and through which the air suction passage extends, a hot water transfer pipe extending from the boiler to the tube to direct a stream of water against a pellet in the tube, a gravity actuated manually insertable slide valve adapted to be inserted within the tube to rest upon a contained beverage pellet, the slide valve when in engagement with a pellet opening communication through the suction passage and through one or more of the water measuring syphon pipes, and a slide valve controlled vent tube extending from the dispensing container to the side of the pellet receiving tube and closed by the slide valve when it is resting upon a pellet.

No references cited.